United States Patent Office 3,639,486
Patented Feb. 1, 1972

3,639,486
TREATMENT OF CUMENE HYDROPEROXIDE FOR USE IN EPOXIDATION REACTIONS
Rudolph Rosenthal, Broomall, Pa., Ming Nan Sheng, Cherry Hill, N.J., and John G. Zajacek, Strafford, Pa., assignors to Atlantic Richfield Company, Philadelphia, Pa.
No Drawing. Filed Dec. 15, 1967, Ser. No. 690,787
Int. Cl. C07c 73/08
U.S. Cl. 260—610 A                5 Claims

ABSTRACT OF THE DISCLOSURE

Method for the treatment of cumene hydroperoxide for use in epoxidation reactions by diluting the cumene hydroperoxide with a hydrocarbon which forms an azeotrope with water, washing the diluted cumene hydroperoxide and removing the hydrocarbon-water-azeotrope.

BACKGROUND OF THE INVENTION

Field of the invention

This invention relates to a method for treating cumene hydroperoxide for use in epoxidation reactions by waterwashing a hydrocarbon diluted solution of the hydroperoxide and removing the water from the cumene hydroperoxide as a hydrocarbon-water azeotrope.

Prior art

A number of recent patents have shown the epoxidation of olefins utilizing an organic hydroperoxide oxidizing agent and a molybdenum-containing catalyst. When commercial cumene hydroperoxide is utilized as the oxidizing agent, however, the conversion and yield obtained are low. If pure cumene hydroperoxide synthesized by well-known laboratory techniques is utilized, conversion and yields are high.

SUMMARY OF THE INVENTION

In accordance with this invention cumene hydroperoxide is diluted with a hydrocarbon such as benzene and the solution is thereafter washed with water. The major portion of the water is removed by simple decantation and the final traces of water are removed from the cumene hydroperoxide by fractionation preferably under vacuum to remove the hydrocarbon-water azeotrope thereby leaving a dry purified cumene hydroperoxide which when used in epoxidation reactions gives high conversions and yields.

It is an object of this invention therefore to treat commercial cumene hydroperoxide to render it suitable for use in epoxidation reactions.

It is another object of this invention to provide a method for the treatment of commercial cumene hydroperoxide with water and thereafter removing the water to give a hydroperoxide product suitable for use in epoxidation reactions.

Other objects of this invention will be apparent from the following description of the preferred embodiments and from the claims.

DESCRIPTION OF THE PREFERRED EMBODIMENTS

The cumene hydroperoxide which is treated in accordance with the process of this invention is the commercially available material. It has been found that when this material is utilized as the oxidizing agent in an epoxidation process involving the use of molybdenumcontaining catalyst that low conversions and yields of the epoxide product are obtained. The epoxidation reaction in which the treated cumene hydroperoxide of this invention is utilized is that described in a number of recent U.S. and foreign patents. The process involves contacting an olefinic compound with an organic hydroperoxide and with a molybdenum-containing catalyst in the liquid phase at a temperature in the range of from about 50° C. to 200° C. The molybdenum-containing catalyst may be any compound of molybdenum, however, those which are soluble in the reaction medium are preferred. In general molybdenum catalysts such as molybdenum hexacarbonyl or molybdenum oxyacetylacetonate can be used although soluble molybdenum complexes produced by reacting molybdenum metal with an organic hydroperoxide in the presence of an alcohol or glycol are quite suitable.

This epoxidation process is applicable to any compound having an olefinic double bond including diolefins and the like. Further details of this epoxidation process are set forth in U.S. Pat. No. 3,351,635.

The commercial cumene hydroperoxide may be diluted with any hydrocarbon for example, benzene, toluene, the xylenes and the like. The preferred compound, however, is benzene, since the azeotrope which is formed is low boiling and therefore is easily separable from the cumene hydroperoxide. The cumene hydroperoxide is preferably diluted with about an equal volume of the hydrocarbon such as benzene although smaller or larger amounts can be used, for example, 1 volume of hydrocarbon/5 volumes of cumene hydroperoxide to 5 volumes of hydrocarbon/1 volume of cumene hydroperoxide.

The amount of water which is used to treat the cumene hydroperoxide-hydrocarbon solution may range from 1 volume of water/5 volumes of solution to 5 volumes of water/1 volume of solution. It is preferable to utilize several treatments with a small volume of water in each treat rather than 1 treatment with a large volume. For example, it is preferred to treat a mixture of 300 ml. of cumene hydroperoxide and 300 ml. of benzene with 300 ml. of water in 3 treatments of 100 ml. each rather than with 1 treatment of the entire 30 ml. The water treatment consists of vigorous agitation for from 1 to 10 minutes although longer times may be used.

After each water treatment the water is allowed to separate as an aqueous phase and is separated by simple decantation or similar method. After the final treat and separation, the hydrocarbon is removed from the cumene hydroperoxide preferably by vacuum distillation. During this distillation the final traces of water are removed as the hydrocarbon-water azeotrope leaving the dry purified cumene hydroperoxide which is suitable for use as the oxidizing agent in the afore-mentioned olefin epoxidation process.

The following examples are provided for the purpose of illustrating the invention in greater detail and to show its usefulness. These examples, however, should not be construed as limiting the invention solely thereto.

EXAMPLE I

A sample of commercial cumene hydroperoxide of about 81 percent purity was diluted with an equal volume of benzene. This solution was washed three times with water, the volume of water being employed in each wash being approximately one-sixth the volume of the benzene-cumene hydroperoxide solution. Each wash was accomplished by vigorous stirring and thereafter the water layer was allowed to separate and was drawn off by decantation. After the third wash the benzene-cumene hydroperoxide solution was vacuum distilled to remove all of the benzene. The small amount of water remaining also was removed as a benzene-water azeotrope leaving dry cumene hydroperoxide.

EXAMPLE II

A 45.4 gram portion of the cumene hydroperoxide treated as in Example I was admixed with 100 grams of toluene and 0.08 gram of molybdenum hexacarbonyl in an autoclave. To this mixture was added 100 ml. of butadiene and the reaction carried out at 100° C. for 40 minutes at a pressure of 75 p.s.i.g. A hydroperoxide conversion of 92.5 weight percent was obtained with a yield of butadiene monoxide of 62.5 weight percent based on the hydroperoxide converted.

EXAMPLE III

A second run was carried out in the same manner as that set forth in Example II. A hydroperoxide conversion of 94.2 weight percent was obtained with a butadiene monoxide yield of 60 weight percent based on hydroperoxide converted.

EXAMPLE IV

A run was carried out in the same manner as that set forth in Examples II and III except that the cumene hydroperoxide had not been treated as in Example I but was the untreated commercial material. Only 44.3 weight percent hydroperoxide was converted and the yield of butadiene monoxide was 42 percent based on the hydroperoxide converted. It will be seen from the comparison of the results in Examples II and III with the results in Examples IV that when commercial cumene hydroperoxide is treated by the method of this invention it is very markedly improved for use in epoxidation reactions. Improvement in conversion and yield are also obtained when other olefinic compounds are epoxidized with the treated cumene hydroperoxide.

As many possible embodiments can be made of this invention without departing from the broad scope thereof, it is to be understood that all matter herein set forth is to be interpreted as illustrative and not as unduly limiting the invention.

We claim:
1. The method for purifying commercially available cumene hydroperoxide of at least about 81 percent purity which comprises diluting the cumene hydroperoxide with a hydrocarbon selected from the group consisting of benzene, toluene and xylene, washing the diluted cumene hydroperoxide with water, allowing the aqueous phase to separate from said hydrocarbon phase comprising said hydrocarbon, cumene hydroperoxide and a minor amount of water, separating the aqueous phase by decantation and thereafter vacuum distilling the hydrocarbon and water and leaving purified cumene hydroperoxide substantially free of water and hydrocarbon.

2. The method according to claim 1 wherein the hydrocarbon is benzene.

3. The method according to claim 2 wherein the volume ratio of benzene to cumene hydroperoxide is in the range of from 5:1 to 1:5.

4. The method according to claim 1 wherein the volume ratio of water to cumene hydroperoxide-hydrocarbon mixture is in the range of from 5:1 to 1.5.

5. The method according to claim 4 wherein the water-treating is carried out with incremental portions of water.

References Cited
UNITED STATES PATENTS

| | | | |
|---|---|---|---|
| 2,680,138 | 6/1954 | Wicklatz | 260—610 |
| 2,906,789 | 9/1959 | McNaughtan | 260—674 |
| 3,171,860 | 3/1965 | Codignola | 260—610 |
| 2,706,708 | 4/1955 | Frank et al. | 260—610 A |
| 3,092,587 | 6/1963 | Ester et al. | 252—426 |
| 2,706,708 | 4/1955 | Frank et al. | 260—610 A |
| 2,430,864 | 11/1947 | Farkas | 260—610 A |
| 2,915,558 | 12/1959 | Alders et al. | 260—610 A |

FOREIGN PATENTS

| | | | |
|---|---|---|---|
| 927,090 | 5/1963 | Great Britain | 260—610 A |

OTHER REFERENCES

Weissberger: "Tech. of Organic Chem. Distillation," vol. IV, pp. 423–426, 458–459 and 478–486.

BERNARD HELFIN, Primary Examiner

W. B. LONE, Assistant Examiner

U.S. Cl. X.R.

203—14, 39, 96